(12) United States Patent
Price et al.

(10) Patent No.: US 7,096,077 B2
(45) Date of Patent: Aug. 22, 2006

(54) TOOL IDENTIFICATION

(75) Inventors: Richard John Price, Bristol (GB); Richard Attwood, Stonehouse (GB)

(73) Assignee: Renishaw PLC, Gloucestershire (GB)

( * ) Notice: Subject to any disclaimer, the term of this patent is extended or adjusted under 35 U.S.C. 154(b) by 0 days.

(21) Appl. No.: 10/481,758

(22) PCT Filed: Jun. 27, 2002

(86) PCT No.: PCT/GB02/02974

§ 371 (c)(1),
(2), (4) Date: Dec. 23, 2003

(87) PCT Pub. No.: WO03/002296

PCT Pub. Date: Jan. 9, 2003

(65) Prior Publication Data

US 2004/0185706 A1    Sep. 23, 2004

(30) Foreign Application Priority Data

Jun. 28, 2001 (GB) .................................. 0115788

(51) Int. Cl.
*G05B 19/18* (2006.01)
(52) U.S. Cl. ............................. 700/66; 439/488; 483/8
(58) Field of Classification Search ................ 700/66; 439/488; 483/8
See application file for complete search history.

(56) References Cited

U.S. PATENT DOCUMENTS 4,588,339 A * 5/1986 Bilz ........................... 409/234

FOREIGN PATENT DOCUMENTS

| DE | 195 43 763 A1 | 5/1997 |
| DE | 196 31 425 A1 | 2/1998 |
| DE | 100 57 284 A1 | 5/2002 |
| EP | 0 155 662 A2 | 9/1985 |
| EP | 0 236 414 B1 | 9/1987 |
| EP | 0 427 661 A2 | 5/1991 |
| EP | 0 508 482 A2 | 10/1992 |
| EP | 1 117 279 A1 | 7/2001 |
| WO | WO 85/02138 | 5/1985 |
| WO | WO 8701798 A1 * | 3/1987 |

OTHER PUBLICATIONS

Braddick; "Mechanical Design of Laboratory Apparatus"; Chapman and Hall Limited; 1960; pp. 5-7 and 9-31.

* cited by examiner

*Primary Examiner*—Leo Picard
*Assistant Examiner*—Sheela S. Rao
(74) *Attorney, Agent, or Firm*—Oliff & Berridge, PLC

(57) ABSTRACT

A tool joint part has a PIC incorporated therein for storing data which can be used to identify the tool to which the joint part is interconnected. PICs are incorporated into tool conditioning circuits. An intermediate circuit operates to match the identity stored digitally in a first PIC with the identity stored digitally in another PIC and thereby connect the tool to the appropriate tool conditioning circuit.

14 Claims, 2 Drawing Sheets

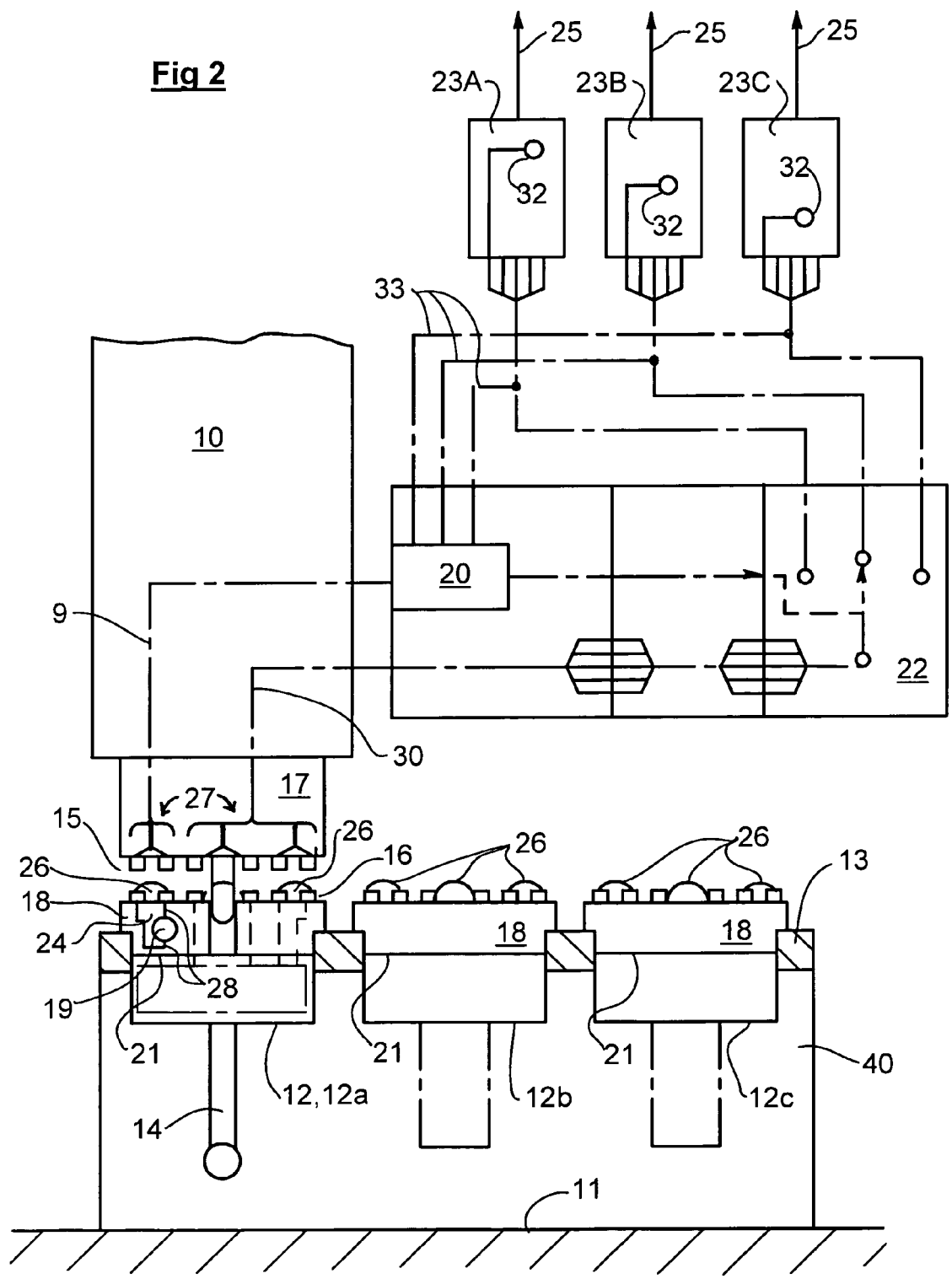

TOOL IDENTIFICATION

BACKGROUND

This invention relates to the identification of tools, e.g. measurement tools used for inspection of work pieces on a co-ordinate positioning machine. Such co-ordinate positioning machines include co-ordinate measurement machines (CMM's), machine tools and robots.

Measurement tools, e.g. probes that respond to surface contact, surface finish probes, proximity probes, crack detection probes, laser and other optical measuring probes, video cameras etc, all have individual requirements for the conditioning of their respective signals. Where a machine uses more than one tool, e.g. each tool being connectable to a universal mounting then it is desirable to have a means for identification of the tool that is mounted to the machine so that its signal can be conditioned correctly. Contact probes sometimes use extension bars and these too require identification.

SUMMARY

One approach to tool identification is described in EP236414. In that patent there is disclosed a tool identification system including a tool having contacts connected to an electrical resistance of a value corresponding to that particular tool type. When the tool is mounted to the machine the connections on the tool make with complementary connections on a universal mounting and the tool is interrogated. The resistance of the tool is measured and the type of tool can thus be recognised by the machine. The appropriate interface circuit for that type of tool can then be selected.

With increasing numbers of types of tool the limitations of this system have become apparent. Use of a standard resistor value series results in a limit to the number of resistance values that can be used and thereby a limit to the number of types of tool that can use such an identification system. Furthermore, errors in resistance values, e.g. due to poor manufacturing tolerance, age of the resistor, or unwanted resistance at the tool connections, can all lead to an incorrect recognition of the type of tool mounted to the machine.

According to one aspect of the invention there is provided a tool identification apparatus comprising:

a first part of a tool joint including a first electrical connection and a releasable mounting, said first part being for releasable coupling to a tool head having a second part of the joint which has a complementary mounting and a second electrical connection;

a tool identification data storage device for storing digitally tool identification data; and a data communication link between the said electrical connection and the said tool identification data storage device for carrying said identification data.

Preferably the data storage device is non-volatile memory.

Preferably the tool identification data storage device comprises a PIC device and wherein the data communication link comprises two conductive paths only.

Preferably the identification data storage device is located at the releasable joint.

Preferably the first part further includes a connector for interconnecting the part to a tool.

Preferably the two conductive paths provide a path for tool power as well as the data communication link.

According to another aspect the invention provides a tool identification system comprising:

tool identification apparatus according to the said one aspect and further comprising:

a tool holding head, the head having a second part of the tool joint having a further mounting for releasably coupling to the first part to the second part, the second part of the joint including a second electrical connection complementary to the first electrical connection for carrying the identification data.

Preferably the tool identification system further comprises:

at least one interface circuit having interface circuit identification data storage for storing interface circuit identification data, the or each interface circuit in use conditioning signals provided by a tool; and an intermediate circuit in further data communication with both the second electrical connection and the or each interface circuit, in use the intermediate circuit being operable to provide an electrical link between the tool and the said at least one interface circuit if the said tool identification data corresponds with the said interface circuit identification data.

Preferably the intermediate circuit is further operable to provide a further link between the tool and a further interface circuit if no identification data is obtained.

According to yet another aspect the invention provides a tool identification system comprising:

a tool holding head, having a second part of a releasable joint; and at least one tool, each tool having a tool identification module connected to the or each tool, the or each tool identification module having a first part of a releasable joint for coupling to the second part of the joint on the head, a connector for interconnecting the tool to the module, and a digital data store for identifying the tool to which the module is connected.

The invention extends to a module for interconnecting both electrically and mechanically a tool to a tool head, wherein the module has a digital data store for identifying the tool to which it is connected.

BRIEF DESCRIPTION OF THE DRAWINGS

One embodiment of the invention will now be described with reference to the drawings, wherein:

FIG. 2 shows a schematic illustration of the electrical arrangement of the invention.

DETAILED DESCRIPTION OF EMBODIMENTS

Figure 1:
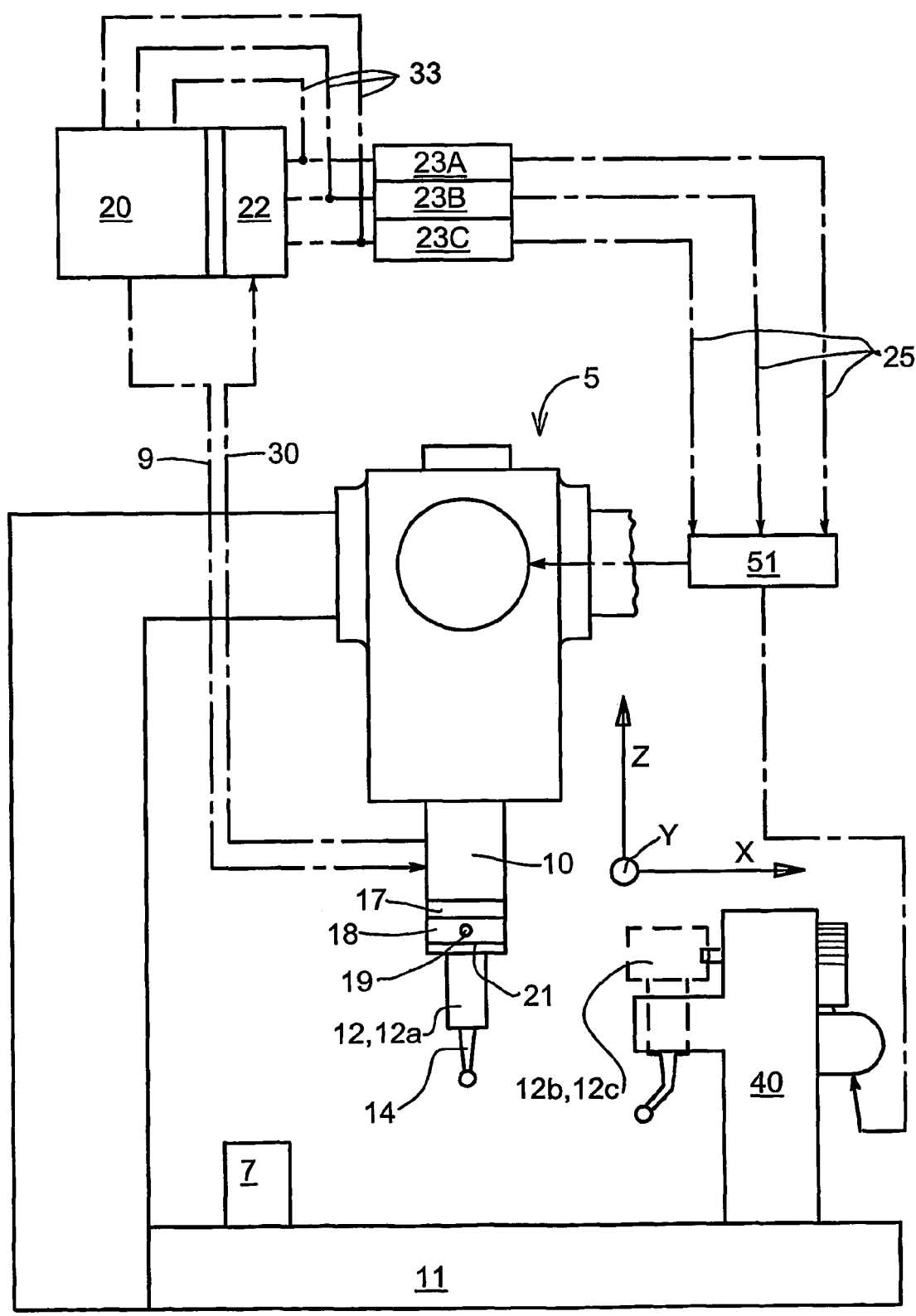
FIG. 1 shows a CMM with interchangeable measuring probes, incorporating the invention.

FIG. 1 shows a known CMM 5 having a head 10 with a releasable kinematic joint 17/18. The lower part 18 of the joint will be common to a number of measurement tools 12, in this case measurement probes 12a, 12b and 12c, and has a kinematic mounting attachable to the upper part of the joint 17. Both parts 17 and 18 will have complementary kinematic mounting features.

Kinematic features are shown in a publication by H. J. J. Braddick called "Mechanical Design of Laboratory Apparatus", Chapman & Hall Limited, 1960 and may additionally include quasi or semi-kinematic designs. As an example of a kinematic mounting there is shown on each of the lower parts 18 three equispaced balls 26, each of which sit in a complementary vee slot 27 on the upper mounting of the joint part 17. The balls and slots are arranged in a triangular formation so six points of contact are made between the mountings at the upper and lower joint parts 17/18. Other kinematic and semi/quasi-kinematic configurations are possible within the ambit of the invention, e.g. three balls contacting a triangular hole, a vee slot and a flat plate respectively.

The CMM has a head 10 which can be moved under the instruction of controller 51 in any of the X, Y or Z directions illustrated and thereby inspect the dimensions of a workpiece 7, sat on base 11, by means of contact of the workpiece by stylus 14 attached to probe 12a. The CMM is also capable of exchanging automatically the probe 12a for another probe 12b,12c housed in a rack 40. The kinematic joint provides repeatable repositioning of probes removed and replaced onto the head 10.

One mechanism for automatic exchange and locking/unlocking of the probe to and from kinematic mounting of joint part 17 is described in detail in WO85/02138. The disclosure in that patent document is incorporated herein. Other joints and mountings can be used. Manual exchange of probes may also be employed. When a rack is used an operator is required initially to place the probes 12 into the rack 40 and this may be done in the incorrect order. Manual exchange of probes may also lead to the wrong probe being fitted to the machine.

Referring also to FIG. 2 an intermediate circuit, in this case a microprocessor 20, is used in this invention to interrogate probe 12 mounted to the head 10 via communication line 9 in order that it can be recognised. Additionally the microprocessor 20 also interrogates probe interface circuits 23A,B and C via communication lines 33 to recognise each circuit 23 in order that the signals from the probe along line 30 can be routed to the correct interface circuit by relay switches at circuit 22. From the appropriate interface circuit the signal is fed to the CMM controller 51 via lines 25 and optionally to a computer for processing of data.

The identification of the probes 12 and interface circuits 23 is possible because a data store 19 and 32 is held in each probe and interface circuit respectively. The data store is digital information in code form held in a non-volatile memory which can identify the probe/interface. This data store is read by the microprocessor 20, and the microprocessor operates ranks of switches (relays) 22 so that information to and/or from the probe is communicated to/from the correct interface.

Since it is likely that the data store will be incorporated into different types of tools, it is convenient to locate the data store in the releasable joint part 18 so that the joint part can be standardised and used in all types of tool and no modifications to other parts of the tool will be required. Thus the joint part 18 may have a modular form, i.e. a discrete component which can be sold separately. This tool identification module will have a digital data store (e.g. a programmable integrated circuit (PIC)) which is programmed or is programmable so that it can identify the tool to which it is attached.

Each joint part 18 will have, as well as its kinematic features, a tool connector 21 for interconnecting the various tools e.g. 12a,b and c to the joint part 18. The connector could be a simple screw type fixing.

FIG. 2 shows in more detail the electrical arrangement illustrated in FIG. 1. In this Fig the tools 12a,b and c can be seen housed in rack 40. The tools (including probe 12a) have electrical contacts 16 at the releasable joint part 18 that co-operate with complimentary contacts 15 on the universal mounting of the joint part 17. Two of the contacts 16 are connected to probe data store 19, in this instance a programmable integrated circuit (PIC). The PIC has a digital code embedded in memory therein which can be recognised by the processor 20. A similar PIC 32 is used as a data store in each interface circuit 23 and likewise, the processor 20 can recognise a code embedded in the PIC 32.

An advantage of using a PIC is that just two wires 28 or other conductive paths can be employed to carry the stored data and interrogate the PIC, via a serial interface and these wires, at the tool at least, can be used for probe power also. Additionally the use of two wires means that backward compatibility is possible i.e. the probe etc, previously fitted with a resistor identification (as detailed in the discussion of the prior art) can be recognised also by the processor 20. In such circumstances the processor 20 can be adapted to measure the resistance of the two wires. If the resistance varies from a known value used to denote a digital identification (i.e. the tool is an "old" resistance identified probe) then the processor can route a tool communication to a pre-defined port of the intermediate circuit 20. This port may be in communication with an appropriate interface 23, or may be in communication with a further intermediate circuit for selecting one of a number of interfaces depending on the resistance of the tool in the head 10. Thus a digital system of tool identification can be made backwardly compatible with the known resistance type identification system.

Additionally, it may be desirable to make a group of tools compatible with a single (or a few) interface circuit(s), or vice versa. This can be achieved by adding identification codes, but not necessarily an additional PIC to the interface so that effectively it has more than one identity, each of which will be pairable with a code from a member of the compatible group of tools, or vice versa.

The invention claimed is:

1. A measurement tool identification system comprising:
a co-ordinate positioning machine including a intermediate circuit, a measurement tool holding head, the head including a first joint part having a first releasable mounting and a first electrical connection in electrical communication with the intermediate circuit, and at least one interface circuit in electrical communication with the intermediate circuit, for conditioning the outputs of a tool, the at least one interface circuit having an interface circuit identification device;
a second joint part including a second releasable mounting and a second electrical connection, each being complementary with the mounting and connection of the first joint part, the second joint part including a measurement tool identification device,
the tool and circuit identification devices each comprising a digital data store and wherein the intermediate circuit interrogates the digital data stores of the tool and interface circuit identification devices in order to identify the tool and interface circuits and electrically connects the appropriate interface circuit to the second joint part following the identification.

2. The measurement tool identification system of claim 1, comprising the data storage device being non-volatile memory.

3. The measurement tool identification system of claim 2, comprising the digital data stores each including a programmable device and electrical communication between the intermediate circuit and the second joint part comprises only two conductive paths.

4. The measurement tool identification system of claim 2, comprising the measurement tool identification device being located within the second joint part.

5. The measurement tool identification system of claim 1, comprising the digital data stores each including a programmable device and electrical communication between the intermediate circuit and the second joint part comprises only two conductive paths.

6. The measurement tool identification system of claim 5, comprising the two conductive paths providing a path for measurement tool power as well as data for tool identification.

7. The measurement tool identification system of claim 5, comprising the measurement tool identification device being located within the second joint part.

8. The measurement tool identification system of claim 1, comprising the measurement tool identification device being located within the second joint part.

9. The measurement tool identification system of claim 8, comprising the second joint part including a connector for interconnecting the second joint part to a measurement tool.

10. The measurement tool identification system of claim 9, comprising the complementary releasable mountings of the first and second joint parts forming a kinematic mounting.

11. The measurement tool identification system of claim 10, comprising the intermediate circuit being operable to electrically connect the tool and another interface circuit if no identification data is obtained during interrogation.

12. The measurement tool identification system of claim 10, comprising the intermediate circuit being operable to electrically connect the tool and another interface circuit if the resistance across the second electrical connection varies from a predefined value used to denote digital identification.

13. A measurement tool including a joint part comprising a portion of a releasable kinematic mounting and a portion of an electrical connection, each portion being co-operable with a complementary portion on a co-ordinate positioning machine, the tool further including a first digital data store for holding a digital tool identification code, in combination with an interface circuit for the tool which comprises a second digital data store for holding a digital interface circuit identification code, whereby when the tool is connected to the co-ordinate positioning machine and interrogated thereby, the tool digital identification code identifies the tool and indicates that the tool is to be electrically connected to said interface circuit having said digital interface circuit identification code.

14. The measurement tool of claim 13, wherein the tool has a predefined resistance that, when connected to the coordinate positioning machine and interrogated thereby, indicates that the tool contains said digital tool identification code.

* * * * *